US012750291B2

(12) United States Patent
Lee

(10) Patent No.: US 12,750,291 B2
(45) Date of Patent: Sep. 29, 2026

(54) UPF TRANSFERRING DATA FOR ANALYSIS TO DWDAF AND OPERATING METHOD THEREOF

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/027,463

(22) PCT Filed: Oct. 13, 2021

(86) PCT No.: PCT/KR2021/014105

§ 371 (c)(1),
(2) Date: Mar. 21, 2023

(87) PCT Pub. No.: WO2022/092624

PCT Pub. Date: May 5, 2022

(65) Prior Publication Data

US 2023/0370344 A1 Nov. 16, 2023

(30) Foreign Application Priority Data

Oct. 30, 2020 (KR) ........................ 10-2020-0143142

(51) Int. Cl.
*H04L 43/02* (2022.01)
*H04L 41/0631* (2022.01)
(Continued)

(52) U.S. Cl.
CPC .......... *H04L 43/02* (2013.01); *H04L 41/0631* (2013.01); *H04L 43/0852* (2013.01); *H04L 67/51* (2022.05)

(58) Field of Classification Search
CPC . H04L 41/0631; H04L 43/02; H04L 43/0852; H04L 67/51
(Continued)

(56) References Cited

U.S. PATENT DOCUMENTS

2005/0216418 A1* 9/2005 Davis .................... H04L 63/102
705/59
2009/0287781 A1* 11/2009 Newcomb, Jr. ......... G06F 9/546
709/206
(Continued)

FOREIGN PATENT DOCUMENTS

CA 3 135 354 A1 10/2020
CN 110621032 A 12/2019
(Continued)

OTHER PUBLICATIONS

Merriam-Webster's Collegiate Dictionary 1346 (conj. def. 2) (10th ed. 1993) (Year: 1993).*
(Continued)

*Primary Examiner* — David P Zarka
(74) *Attorney, Agent, or Firm* — Hauptman Ham, LLP

(57) ABSTRACT

Apparatuses and methods for providing data for analysis in which a user plane function (UPF) transfers specific information for analysis to a network function data analytics function (NWDAF) are disclosed. One of the apparatuses includes a service based interface (SBI) communication unit configured to perform communication via an SBI between network functions NFs); and an information transferring unit configured to communicate with a specific NF having an information analysis function for each of the NFs via the SBI communication unit for transferring specific information of the UP required for analysis to the specific NF.

14 Claims, 6 Drawing Sheets

(51) Int. Cl.
*H04L 43/0852* (2022.01)
*H04L 67/51* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2010/0097987 | A1* | 4/2010 | Chun | H04L 1/1887 370/328 |
| 2013/0274941 | A1* | 10/2013 | Khozikov | G06F 21/55 700/286 |
| 2016/0191521 | A1* | 6/2016 | Feroz | G06F 16/9535 726/1 |
| 2017/0215132 | A1* | 7/2017 | Moisanen | H04B 7/0613 |
| 2017/0331703 | A1* | 11/2017 | Sui | H04L 41/5003 |
| 2020/0196169 | A1 | 6/2020 | Dao et al. | |
| 2020/0228420 | A1* | 7/2020 | Dao | H04L 41/142 |
| 2020/0358670 | A1* | 11/2020 | Lee | H04L 41/5067 |
| 2020/0358689 | A1* | 11/2020 | Lee | H04L 43/028 |
| 2020/0396677 | A1* | 12/2020 | Estevez | H04L 41/145 |
| 2021/0014141 | A1* | 1/2021 | Patil | H04W 76/25 |
| 2021/0105656 | A1* | 4/2021 | Estevez | H04L 41/5067 |
| 2021/0250785 | A1* | 8/2021 | Örtenblad | H04W 24/02 |
| 2021/0288886 | A1* | 9/2021 | Örtenblad | H04W 40/02 |
| 2022/0038946 | A1* | 2/2022 | Kim | H04W 28/24 |
| 2022/0070963 | A1* | 3/2022 | Ianev | H04W 76/28 |
| 2022/0337486 | A1* | 10/2022 | Hong | H04L 41/14 |
| 2022/0345925 | A1* | 10/2022 | Garcia Martin | H04W 24/10 |
| 2023/0318746 | A1* | 10/2023 | Kim | H04W 76/22 370/235 |
| 2023/0345297 | A1* | 10/2023 | Karampatsis | H04L 41/342 |
| 2024/0049021 | A1* | 2/2024 | Fan | H04L 41/5025 |

FOREIGN PATENT DOCUMENTS

| | | | | |
|---|---|---|---|---|
| CN | 111226449 | A | | 6/2020 |
| CN | 111656811 | A | | 9/2020 |
| JP | 2012165335 | A | * | 8/2012 |
| KR | 10-2020-0043729 | A | | 4/2020 |
| WO | 2020/126108 | A1 | | 6/2020 |
| WO | 2020/200037 | A1 | | 10/2020 |

OTHER PUBLICATIONS

The American Heritage Dictionary of the English Language 2032 (adv. def. 6) (3rd ed. 1992) (Year: 1992).*
International Search Report issued on Jan. 21, 2022, for corresponding International Patent Application No. PCT/KR2021/014105, along with an English translation (6 pages).
Written Opinion issued on Jan. 21, 2022, for corresponding International Patent Application No. PCT/KR2021/014105 (4 pages).
Vivo, "KI#3, New Sol: Network Information Provisioning to EAS with low latency based on L-NWDAF", S2-2007247, SA WG2 Meeting #141E, Electronic. Oct. 2, 2020 (7 pages).
Orange, "Analytics Exposure", S2-1901047, 3GPP TSG-SA WG2 Meeting #130, Kochi, India, Jan. 25, 2019 (4 pages).
China Mobile, "KI #8, New Sol, Providing UE Analytics to the NWDAF", S2-2005567, 3GPP TSG-WG SA2 Meeting #139E, Elbonia, Aug. 13, 2020 (10 pages).
Ericsson, "Reporting UPF measurements to NWDAF", S2-1903297, SA WG2 Meeting #132, Xi'an, China, Apr. 2, 2019 (4 pages).
Office Action dated Aug. 12, 2025 for corresponding Chinese Patent Application No. 202180074370.8, along with an English translation (18 pages).
Orange, "Updates of Solution #6", S2-187946, 3GPP TSG-SA WG2 Meeting #128BIS, Sophia Antipolis, France, Aug. 20-24, 2018, (7 pages).
Deutsche Telekom AG et al., "Introduction of indirect communication between NF services, and implicit discovery", 3GPP TSG-SA2 Meeting #130, Santa Cruz-Tenerife, Feb. 25-Mar. 1, 2019, (16 pages).
Notice of Allowance dated Jun. 18, 2026, for corresponding Korean Patent Application No. 10-2020-0143142, along with an English machine translation (Total 3 pages).

* cited by examiner

FIG. 5

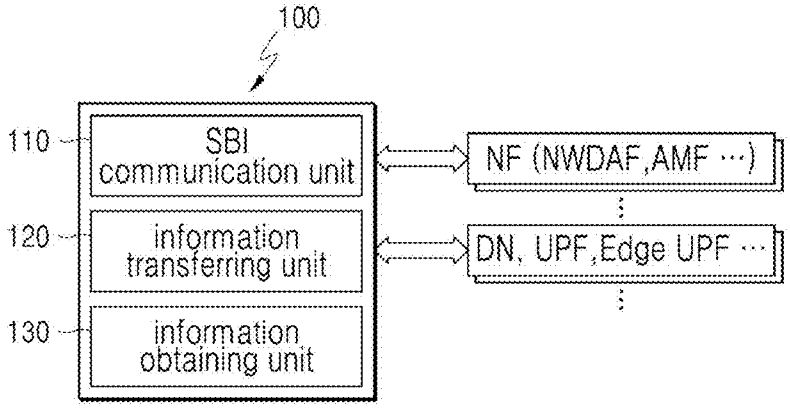

FIG. 6

| Analytics ID | Analytic Information | Location | Format | Event Condition | Processing Information | Load Information |
|---|---|---|---|---|---|---|
| Packet Trace | Full Data, Sampled Data, Partial/Ranged Data | RAN Side (N3 I/F) UPF Side (N6 I/F) | Pcap, encryption, compressed | Report every 10 second | Processing algorithm type 1, 2, ··· | Perform when Load <50% |
| Application Trace | Signature-based, Heuristic-based, mVoIP, Video Streaming, File Download, etc. | UPF Side (N9, N6 I/F) | ASCII Text, binary, compressed | Report immediate | Processing algorithm type 3, 7, ··· | Perform when Load <60% |
| Service QoE | Video Streaming QoE, MOS | UPF Side (N6 I/F) | Statistics | Notify when certain condition meet | Processing algorithm type 4, 5, ··· | Perform when Load <20% |

UPF TRANSFERRING DATA FOR ANALYSIS TO DWDAF AND OPERATING METHOD THEREOF

CROSS REFERENCE TO RELATED APPLICATION

The present application is a national stage filing under 35 U.S.C § 371 of PCT application number PCT/KR2021/014105 filed on Oct. 13, 2021, which is based upon and claims the benefit of priority to Korean Patent Application No. 10-2020-0143142, filed on Oct. 30, 2020, in the Korean Intellectual Property Office. All of the aforementioned applications are incorporated herein by reference in their entireties.

TECHNICAL FIELD

The present disclosure relates to an information analysis technology that analyzes 5G network data.

BACKGROUND ART

In 5G, a network structure is defined to support a user equipment (UE), a base station (access), a core, and a server in an end to end manner.

In addition, in 5G, a network structure is defined in which an area (control plane) for a control signaling function and an area (user plane) for a data sending and receiving function are divided by separating a control signaling function and a data sending and receiving function that have been complexly performed by a single node (e.g., S-GW, P-GW, and the like) in a legacy LTE (4G).

In this instance, a control node of a control plane in 5G may be defined as an access and mobility management function (AMF) that controls wireless section access of a UE, a policy control function (PCF) that manages/controls policy such as UE information, subscribed service information for each UE, charging, and the like, a session management function (SMF) that controls/manages a session for using a data service for each UE, a network exposure function (NEF) that is in charge of a function of sharing information with an external network, a unified data management/authentication function (UDM/AUSF) that manages/controls user subscriber DB and authentication, a network repository function (NRF) that performs a function of managing/controlling information associated with each network function (NF) in a network, a charging function (CHF) that processes charging of a subscriber, a service communication proxy (SCP) that processes communication among various NF services via a mesh structure, and the like.

In 5G, a data node in the user plane (UP) may be defined as a user plane function (UPF) that performs sending and receiving of data between a UE and a server on an external service network (e.g., the Internet) via a session with the UE based on the control of (interoperation with) an SMF.

In 5G, both a control node of the control plane and a data node of the user plane are referred to as network nodes (network functions (NF)).

As described above, in 5G, NFs that perform predetermined functions are defined, and they are defined to mutually interoperate/communicate with each other based on communication that uses a service based interface (SBI) between NFs.

An SBI message used for SBI communication may be a data packet including a header of an application layer such as HTTP, HTTP/2, QUIC, and the like.

In the present standard, an NF data analytics function (NWDAF) that analyses information associated with network data of 5G is defined and discussed.

According to an operation scheme of the existing NWDAF, when an NF of 5G transfers information (data) needed for analyzing information to an NWDAF, the NWDAF performs, based on the received information (data), analysis such as a detailed AI/ML or the like using an OSS/BSS.

However, according to the current standard, a UPF that has data of a large number of customers is incapable of directly communicating with the NWDAF, and the UPF can transfer information (data) to the NWDAF only via an SMF.

Therefore, when a UPF transfers, to an NWDAF, information (data) needed for information analysis, overload may be caused in an interface between the SMF and the UPF.

In addition, the SMF and the UPF process information related to a session and thus, transfer processing of a different type of information (data) may not be assigned to the corresponding PFCP section. Therefore, there is no method of transferring a data packet actually needed for analysis.

Therefore, the present standard does not define a transfer system (a direct transfer path, an information system, or the like) in which the UPF transfers (provides), to the NWDAF, information (data) needed for information analysis.

Accordingly, the present disclosure is to provide a detailed technology that defines a transfer system (a direct transfer path, an information system, and the like) in which an UPF transfers (provides) information (data) for analysis to an NWDAF.

DISCLOSURE OF INVENTION

Technical Problem

The present disclosure is to provide a detailed technology that defines/embodies a transfer system (a direct transfer path, an information system, and the like) in which an UPF transfers (provides), to an NWDAF, information (data) for analysis.

Solution to Problem

A data processing node device of a user plane (UP) according to an embodiment of the present disclosure may include a service based interface (SBI) communication unit configured to perform communication via an SBI between network functions (NF); and an information transferring unit configured to communicate with a specific NF having an information analysis function for each NF via the SBI communication unit for transferring specific information of the UP required for analysis to the specific NF.

Specifically, the specific information of the UP may be transferred to the specific NF according to a subscription by the specific NF and notification scheme based on predefined analysis information ID.

Specifically, the specific information of the UP may be transferred to the specific NF according to a request by the specific NF and response scheme based on predefined analysis information ID.

Specifically, the analysis information ID may be defined for each type of analysis information obtained by analyzing the information associated with the UP via the information analysis function between the UP and the specific NF.

Specifically, the information transferring unit may be configured to: determine whether the specific information is capable of being transferred based on requirement delivered when a subscription or a request that requires transferring the specific information is received; transfer, when the specific information is capable of being transferred, the specific information according to the requirement to the specific NF; and provide, when the specific information is incapable of being transferred, a cause why the transferring is incapable to the specific NF, so that the specific NF changes the requirement based on the provided cause and re-requests transferring of the specific information.

Specifically, the specific information transferred to the specific NF may be in a form of one of first data obtained by tracing a full data packet of a designated session, second data obtained by tracing a part of the data packet of the designated session, third data obtained by compressing the first data or the second data, and fourth data obtained by changing a format of the first data or the second data according to the requirement.

Specifically, the information transferring unit may be configured to determine whether the specific information according to the requirement is capable of being transferred based on at least one of a performance of the SBI, a latency related performance (latency/RTT, Jitter), and a throughput identified when the specific information according to the requirement is transferred to the predetermined NR.

An information transferring method performed by a data processing node device of a user plane (UP) according to an embodiment of the present disclosure may include transferring specific information of the UP required for analysis to a specific NF having an information analysis function for each network function (NF) by communication with the specific NF, wherein the communication with the specific NF is performed via a service based interface (SBI) between NFs.

Specifically, the transferring may comprise determining whether the specific information is capable of being transferred based on requirement transferred from the specific NF; transferring, when the specific information is capable of being transferred, the specific information according to the requirement to the specific NF; and providing, when the specific information is incapable of being transferred, a cause why the transferring is incapable to the specific NF, so that the specific NF changes the requirement based on the provided cause and re-requests transferring of the specific information.

A node device having an information analysis function according to an embodiment of the present disclosure may include a service based interface (SBI) communication unit configured to perform communication via an SBI between network functions (NF); and an information collecting unit configured to communicate with an NF of a user plane (UP) via the SBI communication unit for collecting specific information of the UP required for analysis from the NF of the UP.

Specifically, the specific information of the UP may be collected from the NF of the UP according to a subscription and notification scheme based on predefined analysis information ID.

Specifically, the specific information of the UP may be collected from the NF of the UP according to a request and response scheme based on predefined analysis information ID.

Specifically, the analysis information ID may be defined for each type of analysis information obtained by analyzing the information associated with the UP via the information analysis function between the UP and the node device having the information analysis function.

Specifically, the information collecting unit may be configured to transfer requirement when subscription or request is performed for collecting the specific information, so that the NF of the UP determines whether the specific information is capable of being transferred based on the requirement.

Specifically, the specific information collected from the NF may be in a form of one of first data obtained by tracing a full data packet of a designated session, second data obtained by tracing a part of the data packet of the designated session, third data obtained by compressing the first data or the second data, and fourth data obtained by changing a format of the first data or the second data according to the requirement.

An information collecting method performed by a node device having an information analysis function according to an embodiment of the present disclosure may include communicating with a network function (NF) of a user plane (UP) for collecting specific information of the UP required for analysis from the NF of the UP, wherein the communication with the NF of the UP is performed via a service based interface (SBI) between NFs.

Specifically, the method may further include transferring requirement when subscription or request is performed for collecting the specific information, so that the NF of the UP determines whether the specific information is capable of being transferred based on the requirement.

Advantageous Effects of Invention

According to a data processing node device and an information transferring method performed therein according to an embodiment of the present disclosure, there is provided a detailed technology that defines/embodies a transfer system (a direct transfer path, an information system, and the like) in which an UPF transfers (provides), to an NWDAF, information (data) for analysis.

According to a node device having an information analysis function and an information collecting method performed therein according to an embodiment of the present disclosure, there is provided a detailed technology that defines/embodies a transfer system (a direct transfer path, an information system, and the like) in which an UPF transfers (provides), to an NWDAF, information (data) for analysis.

Therefore, according to the present disclosure, the range of information analysis on network data of 5G may be extended to an UPF, and usability of information analysis, performance of construction of infrastructure, or the like may be improved overall.

BRIEF DESCRIPTION OF DRAWINGS

FIG. 5 is a block diagram illustrating the configuration of a data processing node device (UPF) according to an embodiment of the present disclosure.

FIG. 6 is a table listing an example of an analysis information ID (analytics ID) defined in the present disclosure.

MODE FOR THE INVENTION

Hereinafter, embodiments of the present disclosure will be described with reference to the accompanying drawings.

The present disclosure relates to an information analysis technology that analyzes 5G network data.

In 5G, a network structure is defined to support a user equipment (UE), a base station (access), a core, and a server in an end to end manner.

In addition, in 5G, a network structure is defined in which an area (a control plane) for a control signaling function and an area (a user plane) for a data sending and receiving function are divided by separating a control signaling function and a data sending and receiving function that have been complexly performed by a single node (e.g., S-GW, P-GW, and the like) in a legacy LTE (4G).

Figure 1:
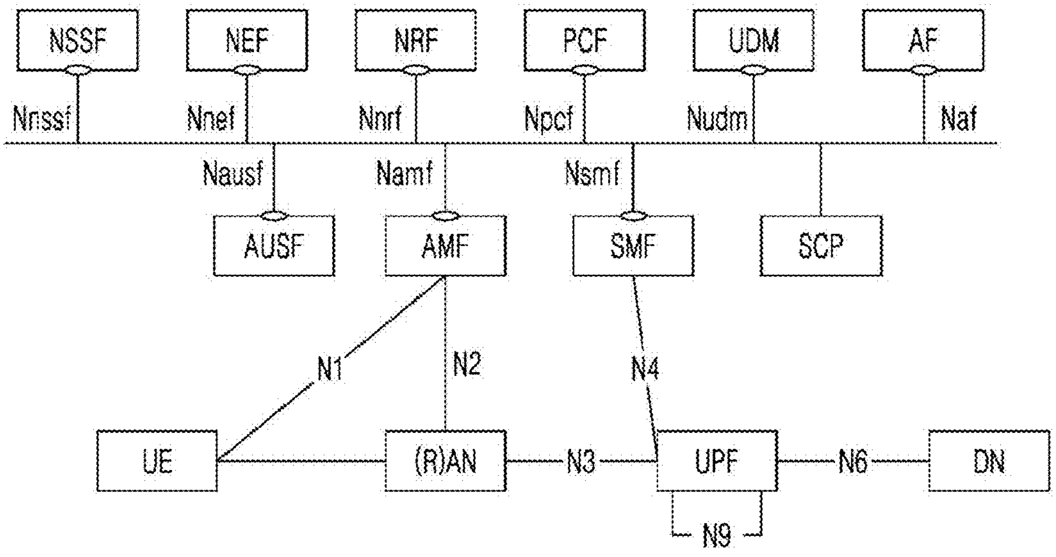
FIG. 1 is a diagram illustrating a 5G architecture.

FIG. 1 is a diagram illustrating a 5G architecture.

As illustrated in FIG. 1, a control node of a control plane in 5G may be defined as an access and mobility management function (AMF) that controls wireless section access of a UE, a policy control function (PCF) that manages and controls policy such as UE information, subscribed service information for each UE, charging, and the like, a session management function (SMF) that controls/manages a session for using a data service for each UE, a session management function (SMF) that controls/manages a session for using a data service for each UE, a network exposure function (NEF) that is in charge of a function of sharing information with an external network, a unified data management/authentication function (UDM/AUSF) that manages/controls user subscriber DB and authentication, a network repository function (NRF) that performs a function of managing/controlling information associated with each network function (NF) in a network, a charging function (CHF) that processes charging of a subscriber, a service communication proxy (SCP) that processes communication among various NF services via a mesh structure, and the like.

In 5G, a network node in the user plane may be defined as a user plane function (UPF) that performs sending and receiving of data between a UE and a server on an external server network (e.g., the Internet) via a session with the UE based on the control of (interoperation with) an SMF.

In 5G, both a control node of the control plane and a data node of the user plane are referred to as network nodes (network functions).

A network function (NF) may consider a CP-UP separation function that is also capable of accepting an NSA/LTE EPC function, and thus, the SMF may embrace a function of serving gateway/packet data network gateway control (S/PGW-C), and the UPF may embrace a function of a serving gateway/packet data network gateway user (S/PGW-U).

The UPF may also embrace a function of a central unit-user plane (CU-UP) of a base station and thus, may also embrace a function of a user plane network node in the type of 'CU-UP+S/PWG-U+UPF' that processes sending and receiving of data.

Accordingly, the data processing node device (UPF) of the present disclosure may include a CU-UP of a base station and S/PGW-U.

As illustrated in FIG. 1, in 5G, NFs that perform predetermined functions are defined and they are defined to mutually interoperate/communicate with each other based on communication that uses a service based interface (SBI) between NFs.

An SBI message used for SBI communication may be a data packet including a header of an application layer such as HTTP, HTTP/2, QUIC, and the like.

According to the present standard, inter-NF communication processing is configured in the form of request/response and subscription/notification as an entity scheme, and an NF is configured as a stateless structure (i.e., context is distributed to a UDSF, a UDM/UDR, and the like).

Accordingly, an NF may be significantly easily embodied and usability of migration and flexibility may be increased. An NF may perform communication based on an SIB (e.g., HTTP/2) and thus, a 'general-purpose' protocol may be used among NFs, which is advantageous.

In the present standard, an NF data analytics function (NWDAF) that analyses information associated with network data of 5G is defined and discussed.

According to the operation scheme of the existing NWDAF, when an NF of 5G transfers data needed for analyzing information to an NWDAF, the NWDAF performs, based on the received information (data), analysis such as a detailed AI/ML or the like using an OSS/BSS.

According to the present standard, a UPF that possesses actual data of a large number of customers is incapable of directly communicating with an NWDAF, and has a structure that enables transferring information (data) only via an SMF.

Figure 2:
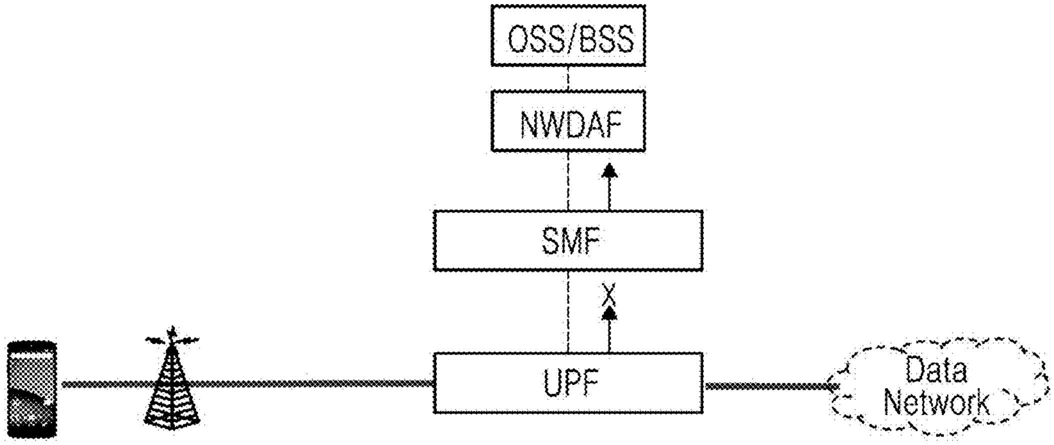
FIG. 2 Prior Art
FIG. 2 and FIG. 3 are diagrams illustrating the existing case and the case of the present disclosure from the perspective in which a UPF transfers, to an NWDAF, information (data) for analysis.

As illustrated in FIG. 2, Currently (conventionally), there is a structure (an indirect transfer path) in which a UPF transfers information (data) needed for analysis to an NWDAF only via an SMF.

Accordingly, the UPF needs to transfer information (data) needed for analysis to the NWDAF via another NF and thus, the number of Hops for transferring is increased and latency may occur in transferring, and overload may be caused in an interface between the SMF and the UPF.

In addition, the SMF and the UPF process information related to a session and thus, a different type of information (data) transfer processing may not be allocated to the corresponding PFCP section.

Therefore, according to the present standard, although the UPF transfers information (data) needed for analysis to the NWDAF via an indirect transfer path (a PFCP section) that passes through the SMF, the structure is incapable of transferring an important data packet actually needed for analysis.

Therefore, the present standard is on a level that does not define a transfer system (a direct transfer path, an information system, or the like) in which the UPF transfers (provides), to the NWDAF, information (data) needed for information analysis.

Accordingly, the present disclosure is to provide a detailed technology that defines/embodies a transfer system (a direct transfer path, an information system, and the like) in which an UPF transfers (provides), to an NWDAF, information (data) for analysis.

Figure 3:
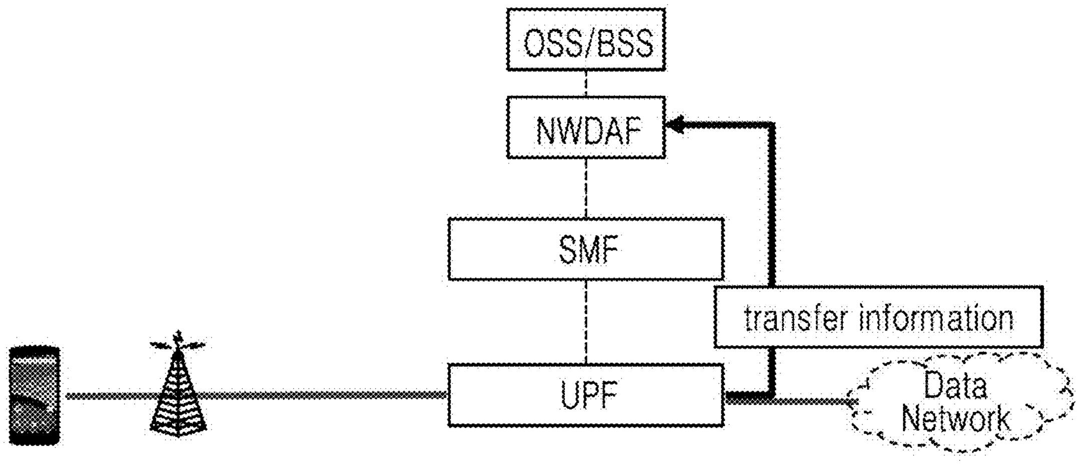

Briefly describing, as illustrated in FIG. 3, the subject matter of the present disclosure is to embody a communication structure in which a UPF directly transfers information (data) needed for analysis to an NWDAF without using another NF (e.g., an SMF).

Furthermore, the present disclosure has a feature of embodying a detailed technology that efficiently processes/transfers important data packets actually needed for analysis, specifically, real-time data packets, when the UPF transfers information (data) needed for analysis to the NWDAF.

Figure 4:
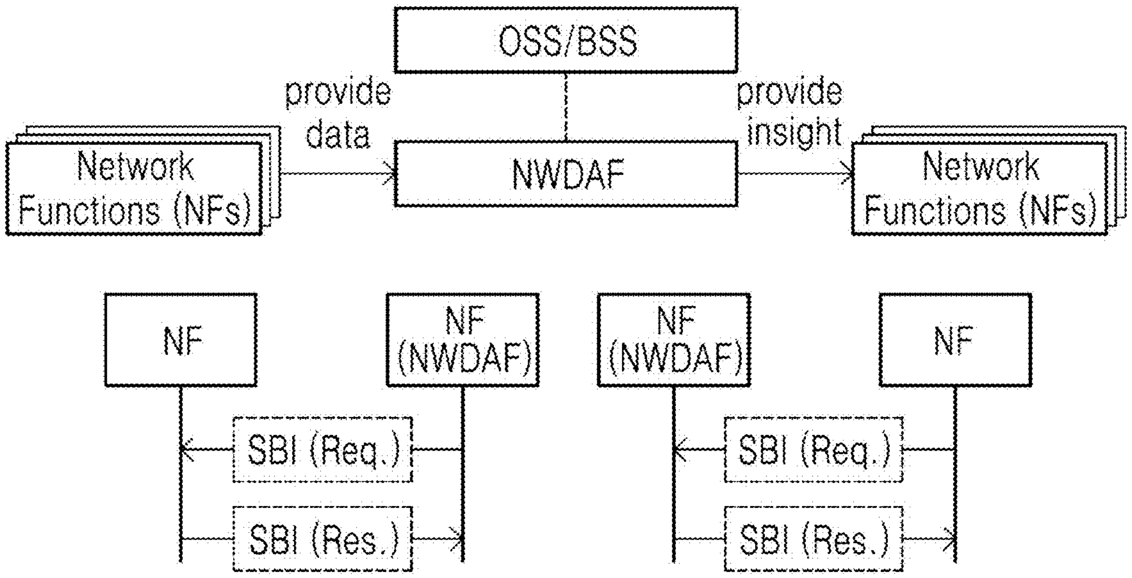
FIG. 4 (PRIOR ART)
FIG. 4 is a conceptual diagram briefly illustrating an NWDAF.

Before providing detailed descriptions of the present disclosure, an NWDAF will be briefly described with reference to FIG. 4.

As described above, the NWDAF is defined as an NF that analyzes information associated with network data of 5G.

If an NF of 5G transfers, to the NWDAF, information (data) that the NF possesses or that is needed for analysis, the NWDAF may perform analysis such as a detailed AI/ML or the like by interoperating with an operation support system (OSS)/business support system (BSS) based on the received information (data).

In this instance, the NF that transfers the information (data) may correspond to a producer NF, and the NWDAF may correspond to a consumer NF that requests transferring of information (data) from the producer NF and receives the transferred information.

Furthermore, the NWDAF may also perform a function of providing, to an NF, insight information obtained based on various analysis results.

In this instance, the NWDAF that provides the insight information may correspond to a producer NF, and the NF that requests and receives the insight information may correspond to a consumer NF.

The examples of the insight information of the existing NWDAF may be as follows.

UE Communication
UE Mobility
Expected UE behavior
Abnormal UE behavior
Observed service experience
QoS Sustainability
User Data Congestion
Network Performance
NF Load analytics
Slice load level In addition, the NWDAF may use a service based interface (SBI) and thus, the NWDAF may perform communication according to a request/response or subscription/notification scheme of the SBI in the case of inter-NF communication.

Based on analysis information ID (analytics ID), the NWDAF may regard, as an ID, information (data) to be analyzed for each NF, and may perform communication (requesting/transferring).

However, according to the present standard, a transfer system (a direct transfer path, an information system, and the like) in which a UPF transfers (provides) information (data) for analysis to the NWDAF is on an inadequate level, and an analytics ID for communicating (requesting/transferring) information (data) of the UPF is not defined.

Accordingly, as described above, the present disclosure is also to newly define an analytics ID.

Hereinafter, the present disclosure is to provide a detailed technology that defines/embodies a transfer system (a direct delivery path, an information system, and the like) in which an UPF transfers (provides), to an NWDAF, information (data) for analysis.

More specifically, the present disclosure provides a data processing node device that may embody above-described technology proposed in the present disclosure.

Such a data processing node device of the present disclosure may be a UPF or a device or module contained in a UPF including a CU-UP and S/PGW-U.

For ease of description, the data processing node device is described as a device that is the same as a UPF (including a CU-UP and S/PGW-U).

FIG. 5 is a diagram illustrating the configuration of a data processing node device (UPF) 100 according to an embodiment of the present disclosure.

As illustrated in FIG. 5, the data processing node device (UPF) 100 of the present disclosure may include an SBI communication unit 110 and an information transferring unit 120.

In addition, the data processing node device (UPF) 100 of the present disclosure may further include an information obtaining unit 130.

That is, the data processing node device (UPF) 100 according to an embodiment of the present disclosure may embody, using the above-described component elements, the above-described technology proposed in the present disclosure.

Hereinafter, each component element included in the above-described data processing node device (UPF) 100 of the present disclosure will be described in detail.

The SBI communication unit 110 may be in charge of a function of performing communication via a service based interface (SBI) between network functions (NF).

That is, the SBI communication unit 110 may perform communication according to a scheme of sending and receiving an SBI message according to an SBI, and may enable communication between the UPF 100 and an NWDAF that uses an SBI, without using another NF (e.g., SMF).

The SBI communication unit 110 may perform communication according to a scheme of sending and receiving an SBI message according to an SBI, and may enable communication between the UPF 100 and an NF that uses an SBI other than the NWDAF.

Accordingly, based on the SBI communication unit 110, the data processing node device (UPF) 100 of the present disclosure may communicate with NFs including the NWDAF via "Nxxx" that may indicate an SBI message (protocol) based on classification for each API (here, it is clearly specified that xxx=NF).

As described above, the present disclosure may configure, in the data processing node device (UPF) 100, the SBI communication unit 110 that performs SBI communication, and may embody a communication architecture in which a UPF is capable of directly transferring information (data) needed for analysis to an NWDAF without using another NF (e.g., an SMF).

The information transferring unit 120 may communicate with a specific NF, which has an information analysis function for analyzing information for each NF, via the SBI communication unit 110, and may be in charge of a function of transferring, to the specific NF, specific information of a user plane (UP) needed for analysis.

In this instance, the specific NF that has an information analysis function of analyzing information for each NF is referred to as the above-described NWDAF.

That is, the information transferring unit 120 may communicate with the NWDAF via the SBI communication unit 110, and may transfer, to the NWDAF, specific information of a UP needed for analysis.

When the NWDAF needs and requests specific information of the UP from the UPF 100, the UPF 100 may operate as a producer NF [NWDAF→(Nupf)→UPF].

In the case that the data processing node device (UPF) 100 of the present disclosure operates as a producer NF, the information transferring unit 120 may perform a role of transferring, to the NWDAF, the specific information of the UP that the NWDAF requests.

When the UPF 100 needs and requests specific information from the NWDAF, the NWDAF may operate as a producer NF and the UPF 100 may operate as a consumer NF [UPF→(Nnwdaf)→NWDAF].

In the case that the data processing node device (UPF) 100 of the present disclosure operates as a consumer NF, the information obtaining unit 130 may act a role of requesting specific information and receiving and obtaining the same from the NWDAF.

Here, a request and transfer (or response) scheme performed between the data processing node device (UPF) 100 of the present disclosure and the NWDAF may be performed according to one of the two schemes, that is, a request/response scheme and a subscription/notification scheme according to an SBI.

The request/response scheme requests specific information needed (request) and immediately receives the same (response), and the subscription/notification scheme requests subscription of specific information needed (subscription) and, when a predetermined state is issued, receives of the specific information that has been subscribed to (notification).

The present disclosure is also to newly design an analytics ID as a part of embodiment of technology that defines/embodies a transfer system in which a UPF transfers (provides) information (data) for analysis to an NWDAF.

To this end, the present disclosure may newly define an analysis information ID (analytics ID) between a user plane and an NWDAF by defining, as an ID, each type of analysis information obtained by analyzing the information of the UP via an information analysis function of the NWDAF.

FIG. 6 is a diagram illustrating an example of an analytics ID defined in the present disclosure.

As illustrated in FIG. 6, the present disclosure may define "packet trace", "application trace", and "service QoE" as analytics IDs (type of analysis information) to be used as causes when an NWDAF regards information (data) to be analyzed as an ID and requests/receives the same from a UPF.

Describing with reference to FIG. 6, for example, in the case of an analytics ID (packet trace), based on an analytics ID (packet trace), an NWDAF in the present disclosure may designate requirements for specific information (hereinafter, packet trace information) needed and may request (request or subscription) the same from the UPF 10.

Accordingly, the data processing node device (UPF) 100 (specifically, the information transferring unit 120) of the present disclosure may transfer (response or notification) specific information (packet trace information) that the NWDAF requests (request or subscription) based on the analytics ID (packet trace), to the NWDAF according to the requirements.

In this instance, the packet trace information transferred may include/deliver a session data packet (data) in a form (full/sampled, partial/ranged, or the like) defined in the analytics ID (packet trace), a location, a format, an event condition, processing information, load information, and the like.

In the case of an analytics ID (application trace) and an analytics ID (service QoE), other than the case of the analytics ID (packet trace), the NWDAF may request and receive the same from the data processing node device (UPF) 100 of the present disclosure according to the table of FIG. 6, in the same manner as the above-description.

For reference, as information included in specific information that the data processing node device (UPF) 100 of the present disclosure transfers to the NWDAF, the following additional information, in addition to the above-described information, may be included/delivered.

For reference, the UPF may include additional information for each item, as shown below.

PDU Session ID and PDU context information

PDR (Packet Detection Rule), FAR (Forward Action Rule), QER (QoS Enforcement Rule), URR (Usage Reporting Rule) information Application ID, S-NSSAI(sst, ssd), Location(E/NCGI), RAT Type, Cell Info, Band/Freq UE information (SUPI, PEI, IMSI, MSISDN)

PDU Anchoring information, UE IP Pool information n-tuple based IP Flow (e.g., 5-tuple=srcIP, dstIP, srcPort, dstPort, protocol)

Uplink/downlink flow size, flow duration, flow count

Flow inter-arrival time, burst period/time

URL/URI, SNI (Server Name Indication), tethering/TTL info per-packet information Packet header & data size, IPv4/IPv6, packet gap time Packet group by size range, counts timestamp (start-time, end-time, duration), statistics (latency, RTT, jitter), throughput (MBPS, TPS)

Describing the information transferring unit 120 again in detail, the information transferring unit 120 may transfer, based on requirements delivered when a request for transferring specific information is received from the NWDAF, specific information according to the requirements to the NWDAF.

In this instance, the requirements may be conditions for designating specific information (specific information needed for analysis) that is desired to be received from the data processing node device (UPF) 100 of the present disclosure, various parameters for the conditions may be used for designating the specific information.

Hereinafter, as an example for a detailed description, the case that requests specific information (hereinafter, packet trace information) based on an analytics ID (packet trace) will be described.

According to an embodiment, based on requirements delivered when a request for transferring of specific information (packet trace information) is received from an NWDAF, the information transferring unit 120 may transfer the specific information (packet trace information) according to the requirements to the NWDAF.

In this instance, the data processing node device (UPF) 100 of the present disclosure may distinguish the requirements for each UPF set information or for each detailed UPF instance included in a UPF set.

Specifically, the requirements may include parameters designating a predetermined subscriber range and prefix (range or prefix of SUPI, IMSI, PEI, MSISDN), a predetermined eNB/gNB region, a location and predetermined PDU session ID, the form of data to be transferred for each session (e.g., Full Data, Sampled Data, Partial/Ranged Data, or the like), or the like.

Accordingly, the information transferring unit 120 may transfer the specific information (packet trace information) according to the requirements to the NWDAF.

In the present disclosure, in the case that the NWDAF requests specific information needed for analysis according to a subscription scheme, various conditions may be defined as conditions (predetermined states) for performing notification.

For example, each of the conditions (a predetermined state) provided below or a combination thereof may be defined, and the information transferring unit 120 may transfer (notification) specific information (packet trace information) according to requirements to the NWDAF when a defined condition (a predetermined state) is satisfied.

- identification of an N/W slice ID of a subscriber, and identification of a subscriber based on a UE IP, an IMSI, an MSISDN, an SUPI, a GPSI, or the like
- PDU session information, n-tuple IP flow information, packet information and time information
- QoS state of a UE, such as triggering in the case of entry/exit of a subscriber to a predetermined region, triggering in the case of handover of a subscriber and in the case of a predetermined control event, and the like
- RAT information of a subscriber (a frequency, a 4G/5G RAT, a base station name, and the like)
- performance of a subscriber (throughput, latency, Jitter (the range of change of latency, that is, jitter))
- RAT (radio quality signal) information of a subscriber (e.g., radio resource block (RB))

The data processing node device (UPF) 100 may trace the entire (full) data packet sent or received via a session that the data processing node device participates in, and may possess the traced full packet trace (e.g., a packet dump) for the purpose of analysis.

Accordingly, the data processing node device (UPF) 100 (particularly, the information transferring unit 120) of the present disclosure may transfer specific information (packet trace information) requested for analysis and full packet trace (e.g., a packet dump) to the NWDAF via an SBI, according to a request and requirements from the NWDAF.

As described above, according to the present disclosure, an analytics ID for requesting/transferring information (data) actually needed for analysis may be defined between the UPF 100 and the NWDAF, and based on the same, a transfer system (a direct transferring path, an information system, and the like) that requests/transfers information (data) for analysis via an SBI without using another NF (e.g., an SMF) may be embodied between the UPF 100 and the NWDAF.

On the assumption of a subscriber that uses data of 1 Gb/s, information (data) of at least 1 Gh/s needs to be transferred in order to transfer full packet trace (e.g., a packet dump) of the corresponding session. In the case that an SBI link between the UPF 100 and the NWDAF is 1 Gb/s or more and it can be processed by the UPF 100 and the NWDAF, full packet trace (e.g., a packet dump) may be capable of being transferred. However, such a situation that allows transferring may not be always maintained.

Accordingly, the present disclosure, as described above, has a feature of embodying technology that efficiently processes/transfers real-time data packets when a UPF transfers information (data) needed for analysis to an NWDAF.

This will be described in details as follows.

Hereinafter, for ease of description, the case that requests specific information (hereinafter, packet trace information) based on an analytics ID (packet trace) will be described.

According to an embodiment, based on requirements delivered when a request for transferring of specific information (packet trace information) is received from an NWDAF, the information transferring unit 120 may determine whether the specific information (packet trace information) according to the requirements is capable of being transferred.

For example, based on at least one of throughput in the data processing node device (UPF) 100, a latency-related performance (latency/RTT, Jitter), and the performance of the SBI identified at the point in time at which the specific information (packet trace information) according to the requirements is transferred to the NWDAF, the information transferring unit 120 may determine whether specific information (packet trace information) according to the current requirements is capable of being transferred.

In the case that the above-described determination result shows that the specific information (packet trace information) is capable of being transferred, the information transferring unit 120 may transfer, to the NWDAF, the specific information (packet trace information) according to the current requirements.

Conversely, in the case that the above-described determination result shows that the specific information (packet trace information) is incapable of being transferred, the information transferring unit 120 may provide, to the NWDAF, a reason (cause) why the transferring is determined as being unavailable as a response so that the NWDAF changes the requirements according to the reason (cause) provided as a response this time, and re-requests transferring of specific information.

Describing by taking an example, it is assumed that full data, that is, full packet trace (e.g., a packet dump) is designated as a form of data to be transferred, in the requirements.

In this instance, if it is determined that specific information (packet trace information, full data) according to the requirements is incapable of being transferred, the UPF 100 of the present disclosure may provide a reason (cause, UPF overload) of the determination to the NWDAF as a response, and the NWDAF may change the requirements (Full Data→Sampled Data) according to the reason provided this time as a response (cause, UPF overload) and may re-request transferring of specific information (packet trace information, sampled data).

Accordingly, the specific information that the data processing node device (UPF) 100 of the present disclosure transfers to the NWDAF may be provided in various forms according to requirements.

In this instance, according to an embodiment, depending on requirements, the specific information transferred to the NWDAF may be provided in the form of first data (above-described full data) obtained by tracing the full data packet of a designated session, and or in the form of second data (above-described sampled data, partial/ranged data) obtained by tracing a part (e.g., a limit size of each packet header (e.g., 128 byte)) of a data packet of a designated session.

Furthermore, depending on requirements, the specific information transferred to the NWDAF may be provided in the form of one between third data obtained by compressing the first data (full data) or the second data (sampled data, partial/ranged data) and fourth data obtained by changing the format of the first data (full data) or the second data (sampled data, partial/ranged data).

In this instance, in the present disclosure, when the specific information is transferred, the form of the specific information transferred to the NWDAF may be classified in detail for each PDU session of a subscriber, for each n-tuple flow in a session, for each application, or for each uplink/downlink.

Accordingly, according to the present disclosure, if a response and a reason (cause, UPF overload) indicating that the specific information (packet trace information) according to requirements is incapable of being transferred is received from the UPF 100, the NWDAF may re-request transferring of specific information according to requirements in which the form of the specific information needed for analysis is changed, based on the reason (cause, UPF overload) obtained as a response, to a form that is capable of being transferred. Accordingly, processing/transferring of real-time information (data packet data) between the UPF 100 and the NWDAF may be efficiently performed without failure.

In the case that the data processing node device (UPF) 100 of the present disclosure operates as a consumer NF, the information obtaining unit 130 may be in charge of a function that requests specific information and receives and obtains the same from the NWDAF.

Using one of a request/response scheme and a subscription/notification scheme, the information obtaining unit 130 may request needed specific information from the NWDAF and may receive and obtain the requested specific information from the NWDAF.

For example, the data processing node device (UPF) 100 of the present disclosure may need to perform detailed detection of predetermined traffic (e.g., detection of a predetermined encrypted packet).

In this instance, in the case that specific information (e.g., a packet signature) needed for the corresponding detection is insufficient in the data processing node device (UPF) 100, the information obtaining unit 130 may request, from the NWDAF, transferring of information together with requirements for designating specific information (e.g., a packet signature) needed (request or subscription).

Then, the NWDAF may search for its DB and may detect the latest DB, and may transfer, to the data processing node device (UPF) 100, the specific information (e.g., a packet signature) of which transferring is requested by the data processing node device (UPF) 100 (response or notification).

As described above, according to the present disclosure, an analytics ID for requesting/transferring information (data) actually needed for analysis may be defined between the UPF 100 and an NWDAF, and based on the same, a transfer system (a direct transferring path, an information system, and the like) that requests/transfers information (data) for analysis via an SBI without using another NF (e.g., an SMF) may be embodied between the UPF 100 and the NWDAF. More particularly, technology that efficiently processes/transfers real-time data packets may be embodied.

As described above, the present disclosure realizes a detailed technology that defines/embodies a transfer system (a direct transferring path, an information system, and the like) in which a UPF transfers (provides) information (data) for analysis to an NWDAF, and thus, may extend the range of information analysis on network data of 5G to a UPF, and may generally improve usability of analysis of information, performance of establishment of infrastructure, and the like.

Figure 10:
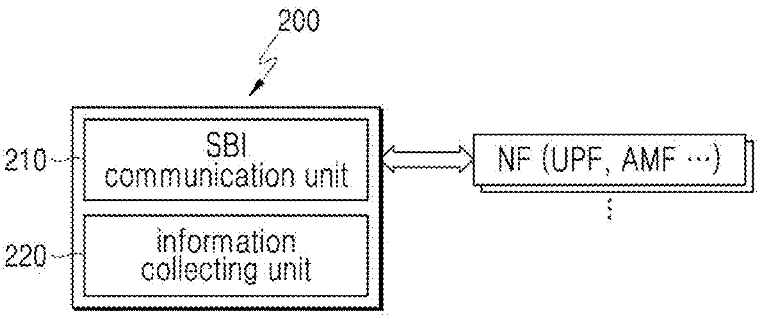
FIG. 10 is a block diagram illustrating the configuration of a node device (NWDAF) having an information analysis function according to an embodiment of the present disclosure.

FIG. 10 is a block diagram illustrating the configuration of a node device (NWDAF) 200 having an information analysis function according to an embodiment of the present disclosure.

As illustrated in FIG. 10, the information analysis function node device (NWDAF) 200 of the present disclosure may include an SBI communication unit 210 and an information collecting unit 220.

That is, the information analysis function node device (NWDAF) 200 according to an embodiment of the present disclosure may realize, using the above-described component elements, the above-described technology proposed in the present disclosure.

Hereinafter, each component element included in the above-described information analysis function node device (NWDAF) 200 of the present disclosure will be described in detail.

The SBI communication unit 210 may be in charge of a function of performing communication via a service based interface (SBI) between network functions (NF).

That is, the SBI communication unit 210 may perform communication according to a scheme of sending and receiving an SBI message, and may enable communication between an NF that uses an SBI and the NWDAF 200 and may also enable communication with a UPF that uses an SBI without using another NF (e.g., an SMF).

The information collecting unit 220 may communicate with an NF of a user plane (UP) via the SBI communication unit 210, and may be in charge of a function of collecting, from the NF of the UP, specific information of the user plane (UP) needed for analysis.

In this instance, the NF of the UP denotes a UPF that uses the above-described SBI.

That is, the information collecting unit 220 may communicate with the UPF via the SBI communication unit 110, and may collect, from the UPF, the specific information of the UP needed for analysis.

Here, a scheme of collecting the specific information of the UP performed between the information analysis function node device (NWDAF) 200 of the present disclosure and the UPF may be performed according to one of the two schemes, that is, a request/response scheme and a subscription/notification scheme according to an SBI.

According to the request/response scheme, based on the above-described analysis information ID, the information analysis function node device (NWDAF) 200 may request, from the UPF, specific information needed, and may receive the same in the form of a response.

According to the subscription/notification scheme, based on the above-described analysis information ID, the information analysis function node device (NWDAF) 200 may request, from the UPF, subscription of specific information needed and, when a predetermined state is issued, may receive the specific information, which has been subscribed to, in the form of a notification.

As described above, the present disclosure realizes a detailed technology that defines/embodies a transfer system (a direct transferring path, an information system, and the like) in which an NWDAF collects information (data) for analysis from a UPF, and thus, may extend the range of information analysis on network data of 5G to a UPF, and may generally improve usability of analysis of information, performance of construction of infrastructure, and the like.

Hereinafter, with reference to FIGS. 7 to 9, an information transferring method according to an embodiment of the present disclosure will be described in detail.

Figure 7:
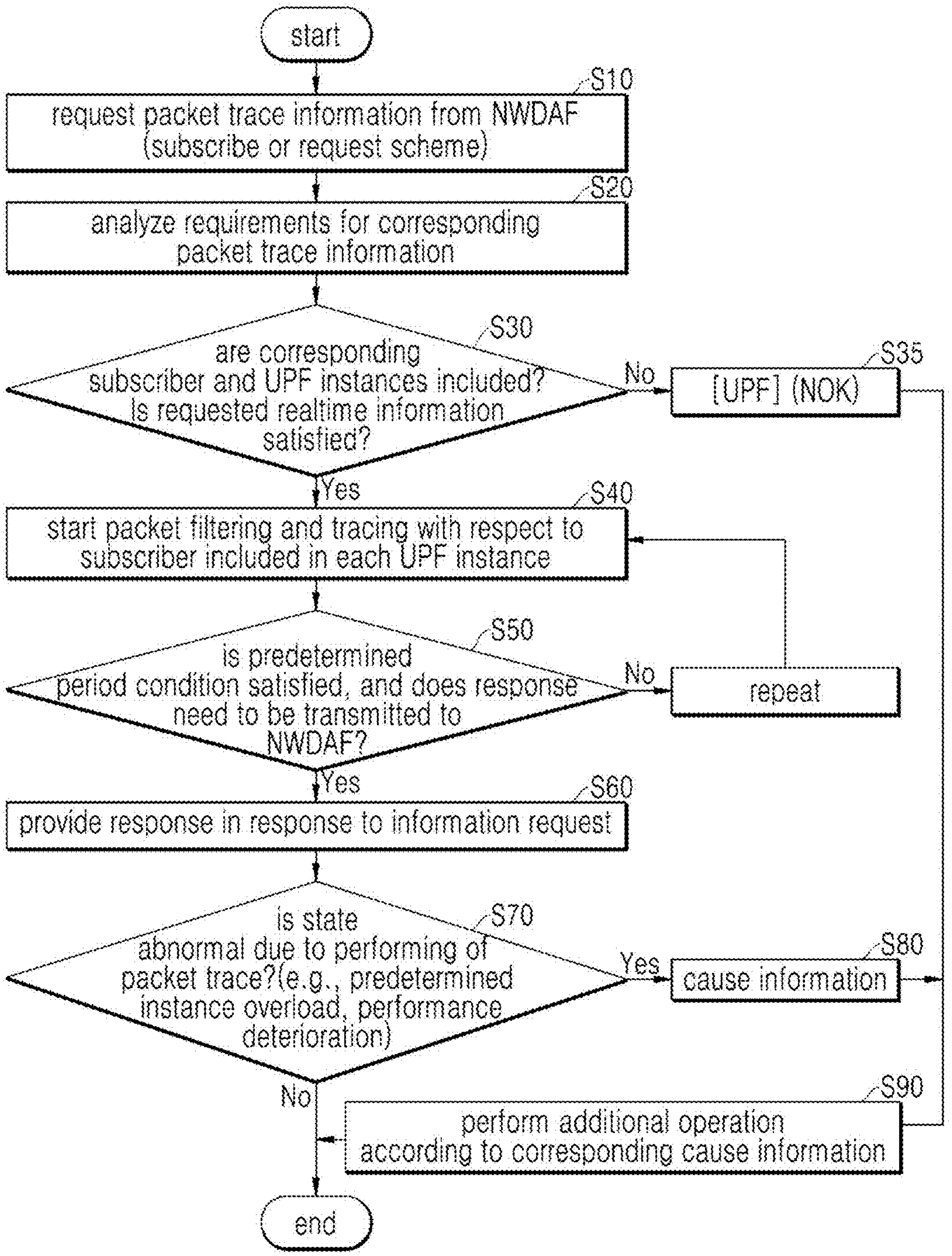
FIGS. 7 to 9 are flowcharts illustrating embodiments of a call-flow supported in an information transferring method/information collection method according to an embodiment of the present disclosure.
Figure 8:
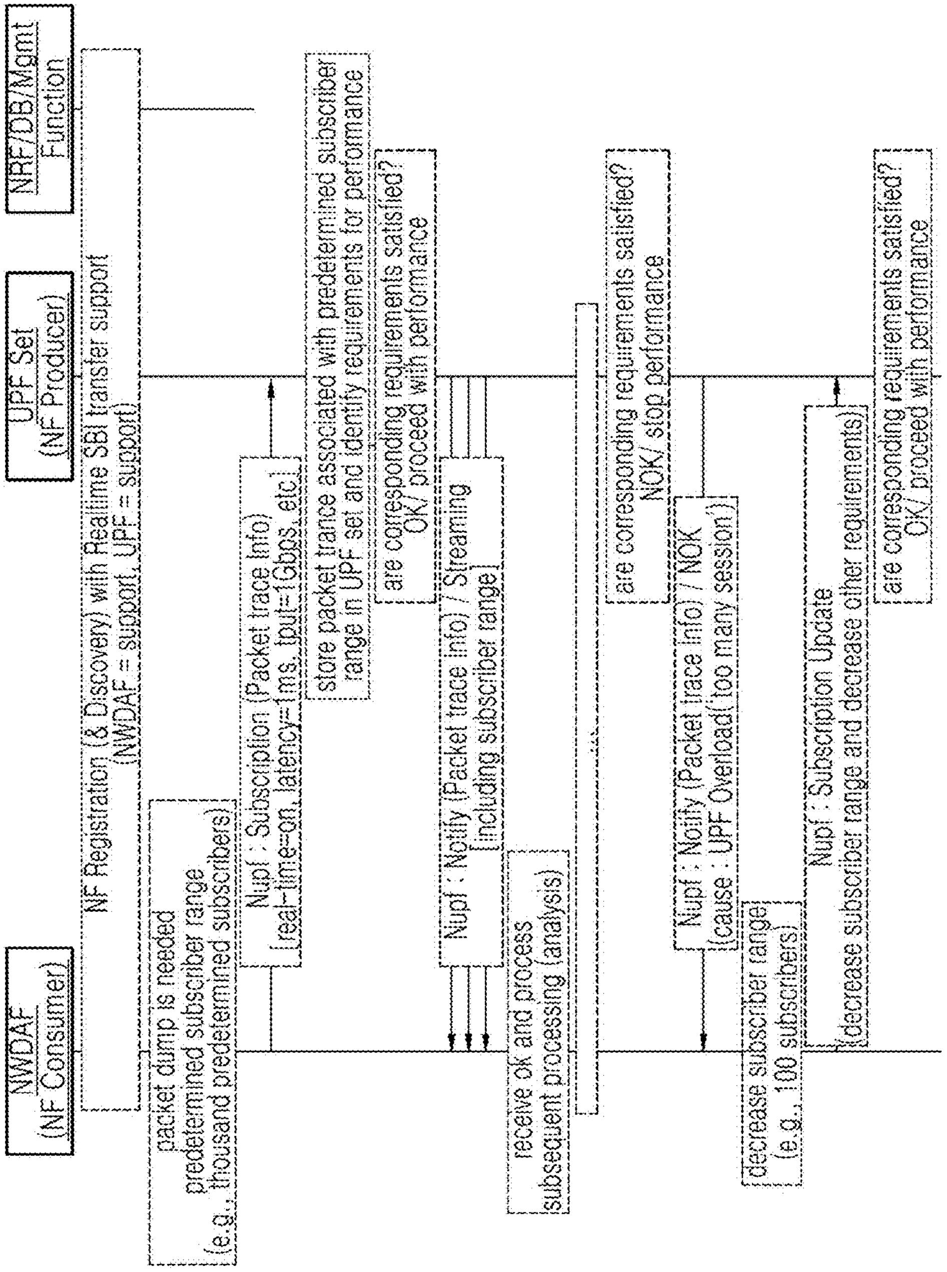
Figure 9:
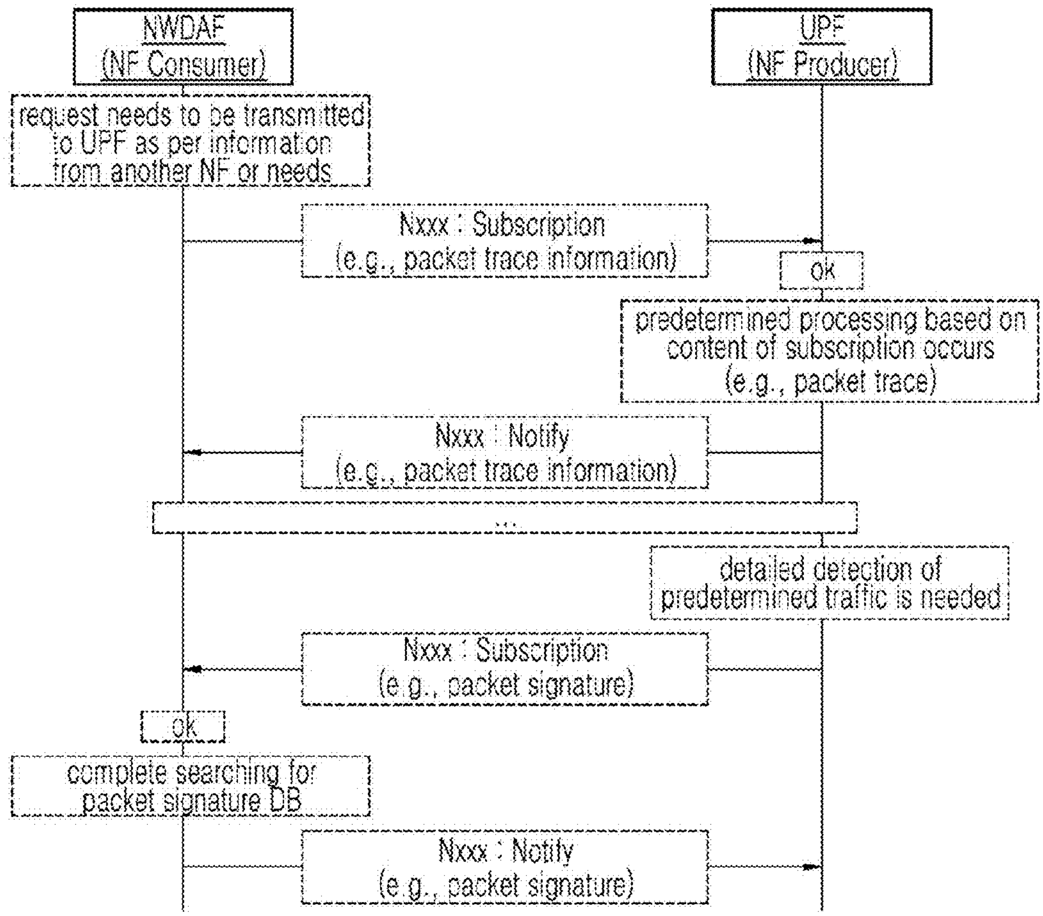

From the perspective of the node device (NWDAF) 200 having an information analysis function, FIGS. 7 to 9 may also correspond to an information collecting method proposed in the present disclosure. However, for ease of description, description will be provided with reference to an information transferring method according to an embodiment from the perspective of the data processing node device (UPF) 100.

First, FIG. 7 illustrates an information transferring method according to an embodiment of the present disclosure in detail from the perspective of the data processing node device (UPF) 100.

For ease of description, as an example for a detailed description, the case in which an NWDAF requests packet trace information based on an analytics ID (packet trace) will be described.

According to the embodiment, in the information transferring method according to the present disclosure, when the UPF 100 receives a request for transferring specific information (packet trace information) from an NWDAF in operation S10, the UPF 100 may analyze requirements for the corresponding specific information (packet trace information) in operation S20.

Accordingly, in the information transferring method according to the present disclosure, the UPF 100 may determine whether the specific information (packet trace information) according to the analyzed requirements is capable of being transferred in operation S30.

For example, the UPF 100 may determine whether a corresponding subscriber designated by the analyzed requirements and UPF instance information are included in the UPF 100, and whether required real-time information (e.g., throughput, latency/RTT, Jitter, the performance of an SBI, and the like) is satisfied.

In the information transferring method according to the present disclosure, if the determination result of operation S30 shows that the specific information (packet trace information) is incapable of being transferred (No in operation S30), the UPF 100 may provide a reason (cause) why the transferring is determined as being unavailable to the NWDAF as a response in operation S35 so that the NWDAF performs an additional operation based on the reason (cause) provided this time, for example, an additional operation that changes the requirements and re-requests transferring of specific information in operation S90.

In the information transferring method according to the present disclosure, if the determination result of operation S30 shows that the specific information (packet trace information) is capable of being transferred (Yes in operation S30), the UPF 100 may start filtering and tracing a data packet associated with a corresponding subscriber included in the designated UPF instance in order to provide the specific information (packet trace information) according to the analyzed requirements in operation S40.

In the information transferring method according to the present disclosure, if the reception of the request in operation S10 corresponds to a request scheme, the UPF 100 may respond/transfer (response), to the NWDAF, specific information (packet trace information) prepared via filtering and tracing as a response to the request in operation S60. If the reception of the request in operation S10 corresponds to a subscription scheme, the UPF 100 may respond/transfer (notification) specific information (packet trace information) prepared for filtering and tracing to the NWDAF in response to the request of operation S10 when a predetermined state (e.g., a predetermined period condition is satisfied) defined in notification occurs (Yes in operation S50) in operation S60.

In this instance, in the information transferring method of the present disclosure, after responding/transferring the specific information (packet trace information) to the NWDAF as a response to the request of operation S10 in operation S60, the UPF 100 may identify whether abnormality (e.g., a predetermined instance overload, performance deterioration, and the like) occurs in the state of the UPF 100 due to an operation performed to transfer the specific information (packet trace information) to the NWDAF, in operation S70. In the case that abnormality is identified (Yes in operation S70), the UPF 100 may provide a related cause to the NWDAF as a response in operation S80 so that the NWDAF performs an additional operation based on the related cause in operation S90.

Subsequently, FIG. 8 illustrates an embodiment of a call-flow supported in the information transferring method of the present disclosure.

As illustrated in FIG. 8, according to the information transferring method of the present disclosure, an NWDAF and the UPF 100 (UPF set) may recognize capability (and a feature) of itself and/or a capability (and a feature) of a counterpart (the NWDAF or the UPF 100 (UPF set)) during an NF registration/discovery process performed with an NRF and MGMT/DB. In this instance, it is recognized whether transferring of real-time specific information (real-time SBI transfer) is supported.

In addition, whether transferring of real-time specific information (real-time SBI transfer) is supported in the NWDAF and the UPF 100 (UPF set) may be dynamically changed via periodic updating of corresponding real-time requirements.

FIG. 8 illustrates the case in which both the NWDAF and the UPF 100 (UPF set) support transferring of real-time specific information (real-time SBI transfer).

The NWDAF may determine that a packet dump is needed for analysis, may designate a predetermined subscriber range (e.g., thousand predetermined subscribers) as requirements, and may request transferring of specific information (subscription).

In this instance, the requirements may designate real-time=on, latency=1 ms, output=1 Gbps, and the like, other than a subscriber range (e.g., thousand predetermined subscribers).

Accordingly, the UPF 100 (UPF set) may store packet trace associated with the predetermined subscriber range (e.g., thousand predetermined subscribers) in the UPF set and may identify performance/requirements (conditions), and if the corresponding requirements (conditions) are satisfied, the UPF 100 may start/process filtering and tracing of a data packet with respect to the designated subscriber range (e.g., thousand predetermined subscribers) in order to transfer specific information (packet trace information) according to the requirements (conditions).

Accordingly, the UPF 100 (UPF set) may transfer the specific information (packet trace information) associated with the predetermined subscriber range (e.g., thousand predetermined subscribers) to the NWDAF in real-time/streaming (notification).

Accordingly, the NWDAF may receive the specific information (packet trace information) transferred in response to the request, and may perform subsequent processing (analysis).

The call-flow described in the lower part of FIG. 8 shows the situation in which the corresponding requirements (conditions) are not satisfied.

That is, if the result obtained by storing packet trace associated with the predetermined subscriber range (e.g., thousand predetermined subscribers) in the UPF set and identifying performance/requirements (conditions), as described above, shows that the corresponding requirements (conditions) are not satisfied, when the UPF 100 (UPF set)

may stop or may not initiate the start/processing of filtering and tracing of a data packet with respect to the designated subscriber range (e.g., thousand predetermined subscribers) in order to transfer specific information (packet trace information) according to the requirements (conditions).

The UPF 100 (UPF set) may provide, to the NWDAF, a reason (cause, e.g., UPF overload ('too many sessions')) why requirements (conditions) are determined as not being satisfied (notification) so that the NWDAF performs an additional operation based on the reason (cause) provided as a response this time, for example, changing the requirements (e.g., thousand predetermined subscribers→hundred subscribers) and re-requesting transferring of specific information.

Subsequently, FIG. 9 illustrates another embodiment of a call-flow supported in the information transferring method of the present disclosure.

An NWDAF may receive information indicating that analysis of a predetermined subscriber and a predetermined slice is needed from another NF or an OSS/BSS, and may determine that a full packet dump is needed for analysis.

In this instance, the NWDAF may request (subscription) transferring of specific information from the UPF, and may specify requirements (packet trace information) associated with transferring of the specific information.

According to the request for transferring of the specific information and requirements, the UPF 100 may perform collection (or filtering) of specific information (packet trace information) corresponding to a full packet dump according to a predetermined time/volume, and may transfer the same to the NWDAF (notification).

The call-flow described below of FIG. 9 shows the situation in which the UPF 100 operates as a consumer NF.

In this instance, in the case that the UPF 100 recognizes that detailed detection of predetermined traffic is needed and it is assumed that specific information (e.g., a packet signature) needed for the corresponding detection is insufficient, the UPF 100 may request, from the NWDAF, transferring of the specific information (e.g., a packet signature) together with requirements that designate specific information (e.g., a packet signature) needed (subscription).

Then, the NWDAF may search for its DB and may detect the latest DB, and may transfer, to the UPF 100, the specific information (e.g., a packet signature) of which transferring is requested from the UPF 100 (notification).

As described above, according to the present disclosure, an analytics ID for requesting/transferring information (data) actually needed for analysis may be defined between the UPF 100 and an NWDAF, and based on the same, a transfer system (a direct transferring path, an information system, and the like) that requests/transfers information (data) for analysis via an SBI without using another NF (e.g., an SMF) may be embodied between the UPF 100 and the NWDAF. More particularly, technology that efficiently processes/transfers real-time data packets may be embodied.

As described above, the present disclosure realizes a detailed technology that defines/embodies a transfer system (a direct transferring path, an information system, and the like) in which a UPF transfers (provides) information (data) for analysis to an NWDAF, and thus, may extend the range of information analysis on network data of 5G to a UPF, and may generally improve usability of analysis of information, performance of construction of infrastructure, and the like.

The information transferring method according to the embodiments of the present disclosure may be embodied in the form of program commands executable by various computer devices, and may be recorded in a computer readable medium. The computer readable medium may include a program command, a data file, a data structure, and the like independently or in combination. The program command recorded in the medium may be designed or configured especially for the present disclosure or may be publicly known to those skilled in the computer software field and may be allowed to be used. Examples of the computer-readable recording medium may include magnetic media such as hard disk, floppy disk, and magnetic tape, optical media such as CD-ROM and DVD, magneto-optical media such as floptical disk, and a hardware device specially configured to store and implement program commands such as ROM, RAM, flash memory, and the like. In addition, the program commands may include, for example, high class language codes, which may be executable in a computer by using an interpreter, as well as machine codes made by a compiler. The above-mentioned hardware device may be configured to operate as one or more software modules in order to perform operations in the present disclosure, and vice versa.

Although the present disclosure has been described in detail with reference to various embodiments, the present disclosure is not limited to the above-described embodiments, and the technical idea of the present disclosure may have the scope within which those skilled in the art field of the present disclosure are capable of making various modifications or corrections without departing from the subject matter of the present disclosure claimed in the following claims.

The invention claimed is:

1. A data processing node device of a user plane (UP), the device comprising:
- a service based interface (SBI) communication unit configured to receive a request for specific information of the UP required for analysis from a specific network function (NF) having an information analysis function for each of network functions (NFs) and to transfer the specific information to the specific NF via a service based interface (SBI), the request including requirements for the specific information; and
- an information transferring unit configured to:
  - determine whether the specific information is capable of being transferred based on the requirements received through the SBI communication unit;
  - transfer, when the specific information is capable of being transferred, the specific information according to the requirement to the specific NF through the SBI communication unit; and
  - provide, when the specific information is incapable of being transferred, a cause why the transferring is incapable to the specific NF through the SBI communication unit, so that the specific NF changes the requirements based on the provided cause and re-requests transferring of the specific information according to the changed requirements.

2. The device of claim 1, wherein, the specific information of the UP is transferred to the specific NF according to a subscription by the specific NF and notification scheme based on predefined analysis information identifier (ID).

3. The device of claim 2, wherein the analysis information ID is defined by the UP and the specific NF for each type of analysis information obtained by analyzing the specific information of the UP via the information analysis function.

4. The device of claim 1, wherein the specific information of the UP is transferred to the specific NF according to a request by the specific NF and response scheme based on predefined analysis information identifier (ID).

5. The device of claim 1, wherein the specific information transferred to the specific NF is in a form of one of first data obtained by tracing a full data packet of a designated session, second data obtained by tracing a part of the data packet of the designated session, third data obtained by compressing the first data or the second data, and fourth data obtained by changing a format of the first data or the second data according to the requirement.

6. The device of claim 1, wherein the information transferring unit is configured to determine whether the specific information according to the requirement is capable of being transferred based on at least one of a performance of the SBI, a latency related performance, and a throughput identified when the specific information according to the requirement is transferred to the predetermined NR.

7. An information transferring method performed by a data processing node device of a user plane (UP), the method comprising:

receiving a request for transferring specific information of the UP required for analysis via a service based interface (SBI) from a specific network function (NF) having an information analysis function for each of network functions (NFs), the request including requirements for the specific information;

determining whether the specific information is capable of being transferred based on the requirements; and in response to determining the specific information is incapable of being transferred based on the requirements, providing a cause why the specific information is incapable to be transferred based on the requirements to the specific NF via the SBI, so that the specific NF changes the requirements based on the provided cause and re-requests transferring of the specific information according to the changed requirements via the SBI.

8. A node device having an information analysis function, the device comprising:

a service based interface (SBI) communication unit configured to transmit a request for at least one of the network functions (NFs) to transfer specific information required for analysis via a service based interface (SBI), the request including requirements for the specific information, and receive at least one of the specific information required for analysis and a cause why the specific information is incapable to be transferred from the NF of the UP via the SBI; and an information collecting unit configured to:

when receiving the specific information required for analysis via the SBI communication unit, collect the specific information of the UP required for analysis; and when receiving the cause why the specific information is incapable of being transferred from the NF via the SBI communication unit, change the requirement based on the cause, and re-request the NF to transfer the specific information to meet the changed requirement via the SBI communication unit.

9. The device of claim 8, wherein the specific information of the UP is collected from the NF of the UP according to a subscription and notification scheme based on predefined analysis information identifier (ID).

10. The device of claim 9, wherein the analysis information ID is defined by the UP and the specific NF for each type of analysis information obtained by analyzing the specific information of the UP via the information analysis function.

11. The device of claim 8, wherein the specific information of the UP is collected from the NF of the UP according to a request and response scheme based on predefined analysis information identifier (ID).

12. The device of claim 8, wherein the information collecting unit is configured to transfer a requirement when a subscription or a request is performed for collecting the specific information, so that the NF of the UP determines whether the specific information is capable of being transferred based on the requirement.

13. The device of claim 12, wherein the specific information collected from the NF is in a form of one of first data obtained by tracing a full data packet of a designated session, second data obtained by tracing a part of the data packet of the designated session, third data obtained by compressing the first data or the second data, and fourth data obtained by changing a format of the first data or the second data according to the requirement.

14. An information collecting method performed by a node device having an information analysis function, the method comprising:

transferring a request for transferring specific information required for analysis to at least one of network functions (NFs) of a user plane (UP) via a service based interface (SBI), the request including requirements for the specific information;

receiving a cause why the specific information is incapable to be transferred based on the requirements from the NF of the UP via the SBI;

changing the requirement based on the cause; and transferring a request for transferring the specific information based on the changed requirement to the NF of the UP via the SBI.

* * * * *